May 21, 1957  O. J. BORROWDALE  2,792,925
MOVABLE BLADE TYPE ELEVATOR CONVEYOR
Filed May 11, 1953  5 Sheets-Sheet 1

INVENTOR.
Orville J. Borrowdale
BY
Gary Desmond & Parker
Attys.

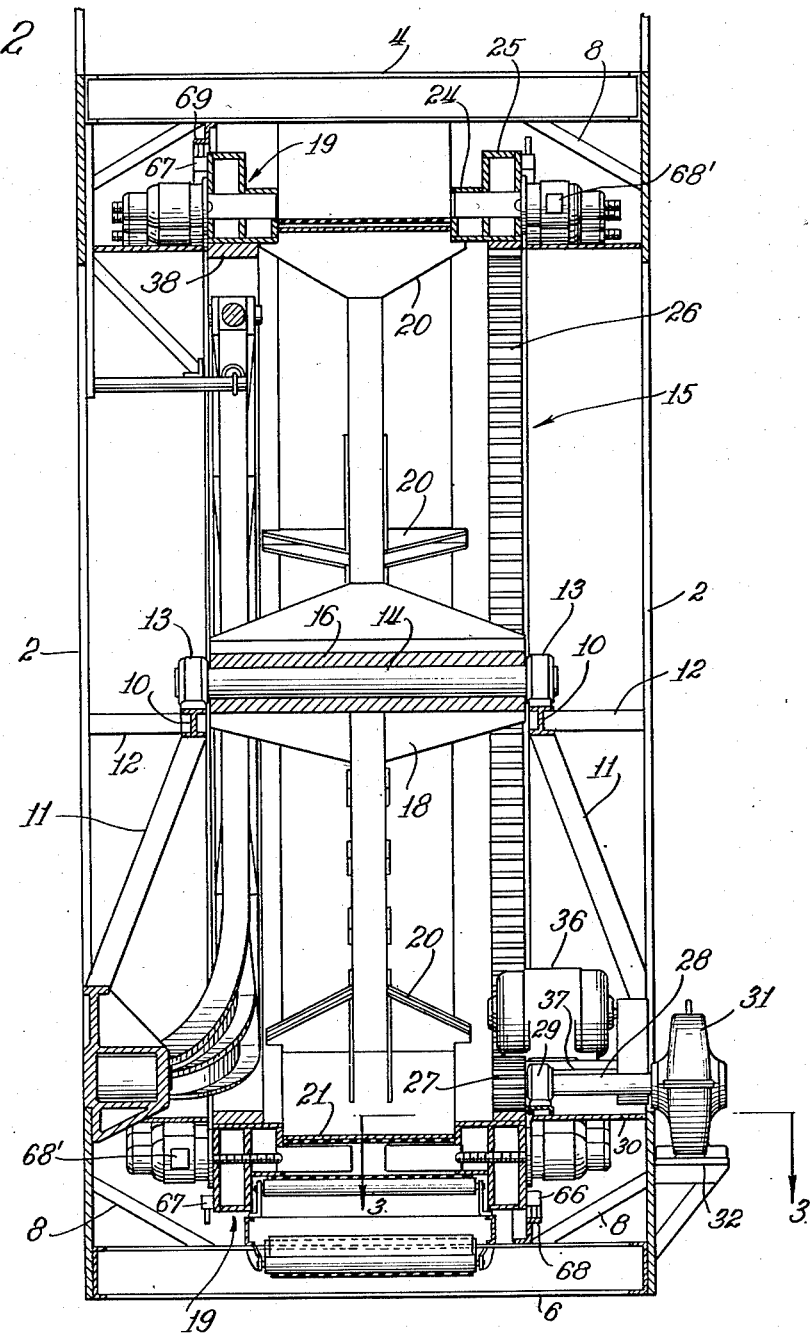

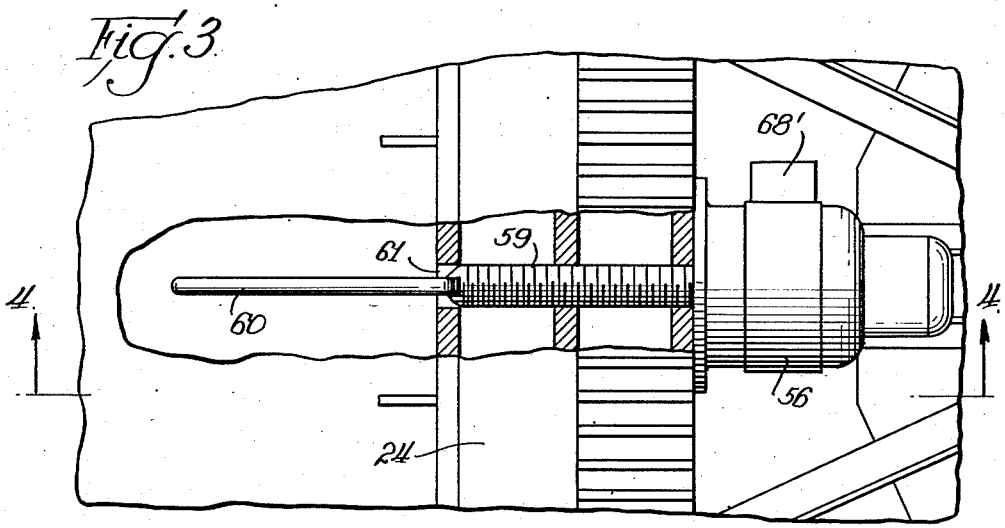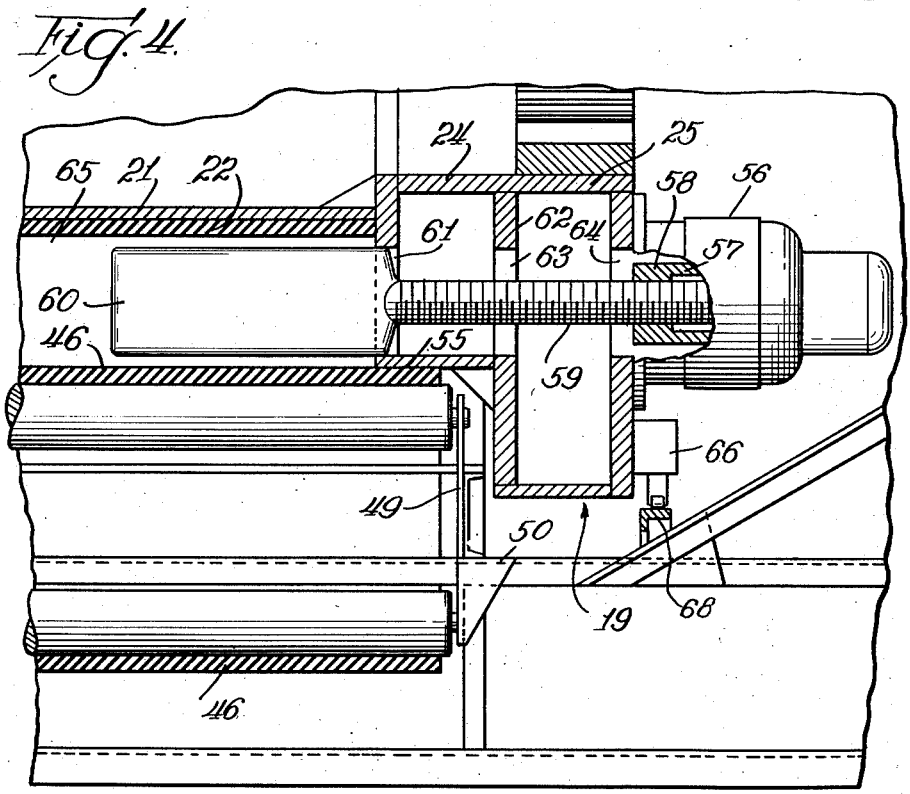

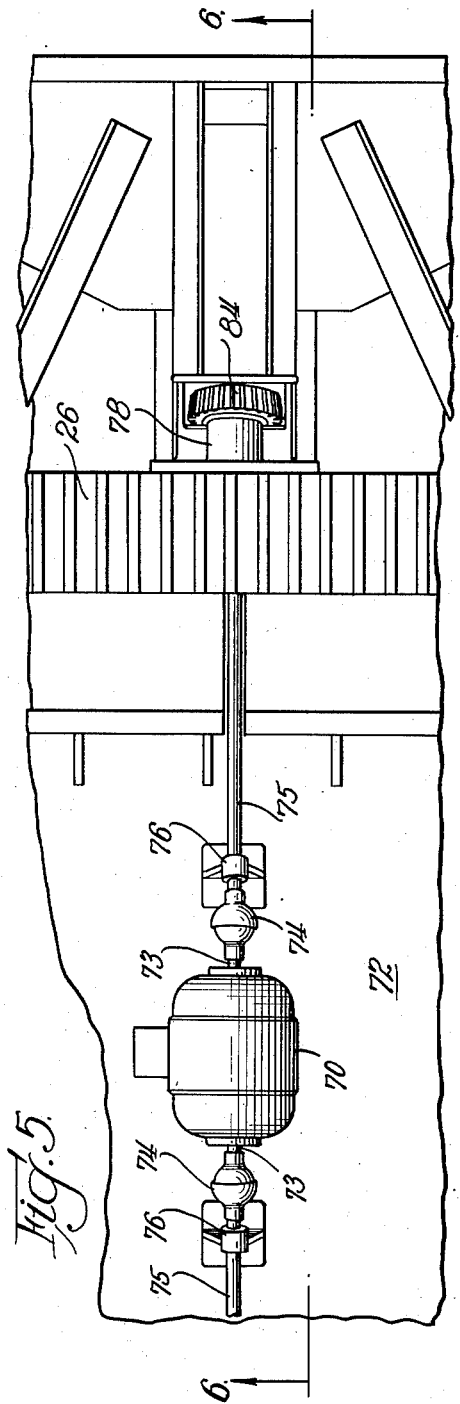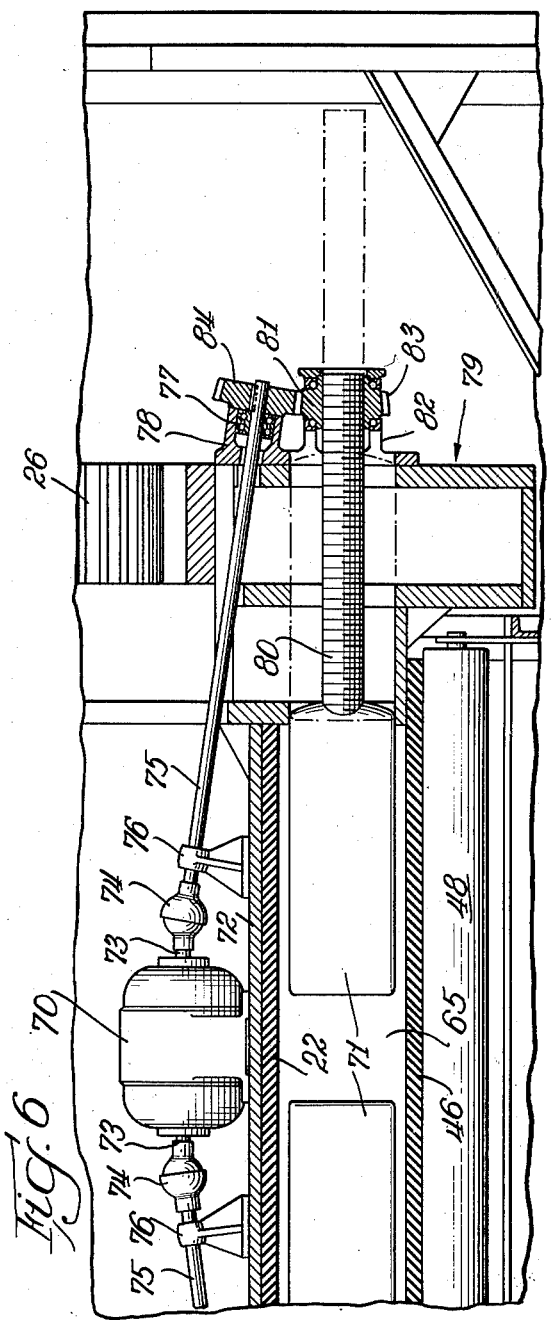

May 21, 1957  O. J. BORROWDALE  2,792,925
MOVABLE BLADE TYPE ELEVATOR CONVEYOR
Filed May 11, 1953  5 Sheets-Sheet 5
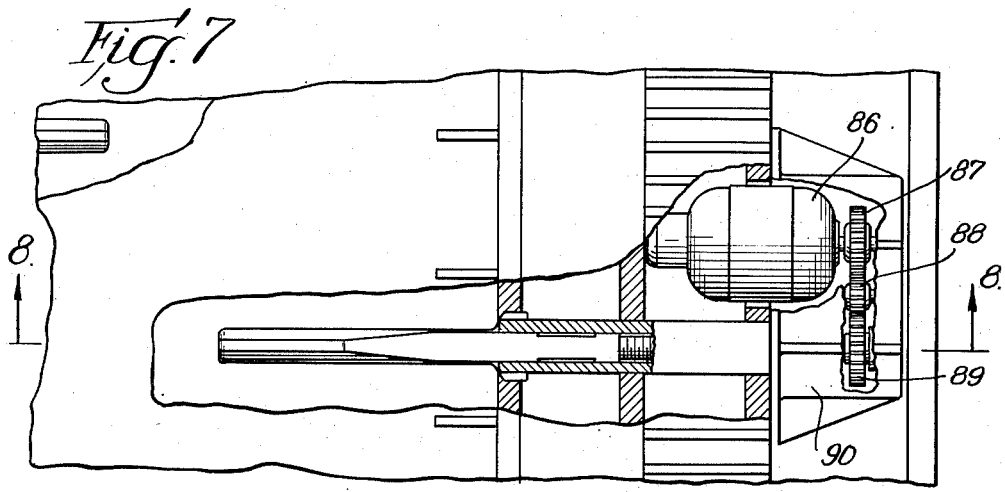
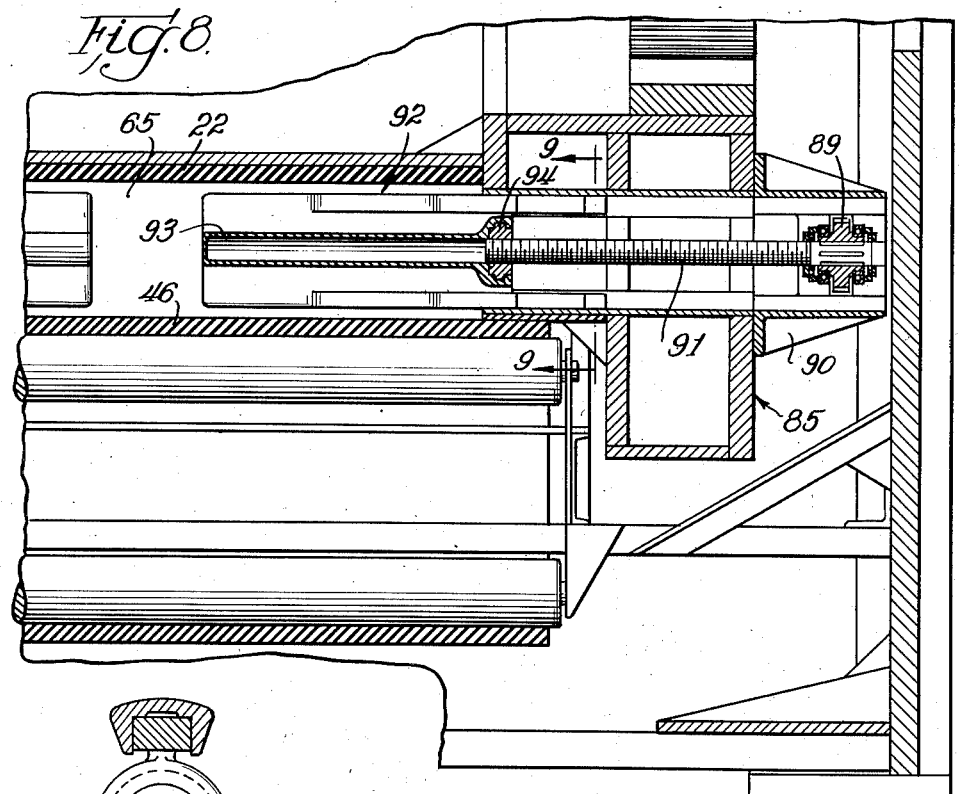
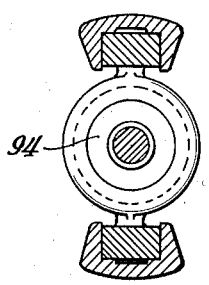
INVENTOR.
Orville J. Borrowdale
BY
Gary Desmond & Parker
Att'ys.

United States Patent Office 2,792,925
Patented May 21, 1957

2,792,925
MOVABLE BLADE TYPE ELEVATOR CONVEYOR

Orville J. Borrowdale, Chicago, Ill.

Application May 11, 1953, Serial No. 353,934

13 Claims. (Cl. 198—167)

This invention relates to improvements in an elevator-conveyor, that is, a mechanism for lifting or elevating material from a lower level to an upper level as a step in the conveying of such materials.

The present invention comprises a device which may, in effect, comprise a link in a conveyor system, wherein the material carried by the conveyor system is continuously raised from a lower level to an upper level, the device being characterized in that a conveyor belt is employed in raising the material wherein the effective lift of the material is relatively great compared to the distance traveled by the belt.

Hoists or inclined conveyors have heretofore been proposed for raising material from a lower level to an upper level, but in substantially all cases where the material is lifted abruptly, as by means of usual bucket hoists, the operation is slow and the equipment is expensive, and where inclined conveyors are employed, the rate of lift relative to the linear travel of the conveyor belt is relatively low negativing the use of such conveyors where the situs of the material being lifted provides only limited space.

As a feature of the present invention a device is contemplated for raising material wherein the rate of rise per unit volume of material carried is high, that is, the capacity is relatively great and wherein the space or distance through which the material is carried is small whereby the device is ideally adaptable to handle materials which are confined in more or less cramped spaces. In addition, the cost of the device and power expended in operating it is relatively low per unit of volume raised per unit of effective lift.

Other objects and advantages of the present invention will be apparent from the accompanying drawings and following detailed description.

In the drawings,

Fig. 2 is a sectional view of the device taken on line 2—2 of Fig. 1.

Fig. 3 is an enlarged detailed sectional view taken on line 3—3 of Fig. 2 illustrating particularly the blade-actuating mechanism.

Fig. 4 is a detailed sectional view taken on line 4—4 of Fig. 3.

Fig. 5 is a sectional view similar to that shown in Fig. 3 illustrating a modified form of blade-actuating mechanism.

Fig. 6 is a detailed sectional view taken on line 6—6 of Fig. 5.

Fig. 7 is a sectional view similar to those shown in Figs. 3 and 5, showing another modified form of blade-actuating mechanism.

Fig. 8 is a sectional view taken on line 8—8 of Fig. 7.

Fig. 9 is a detailed sectional view taken on line 9—9 of Fig. 8.

Figure 1:
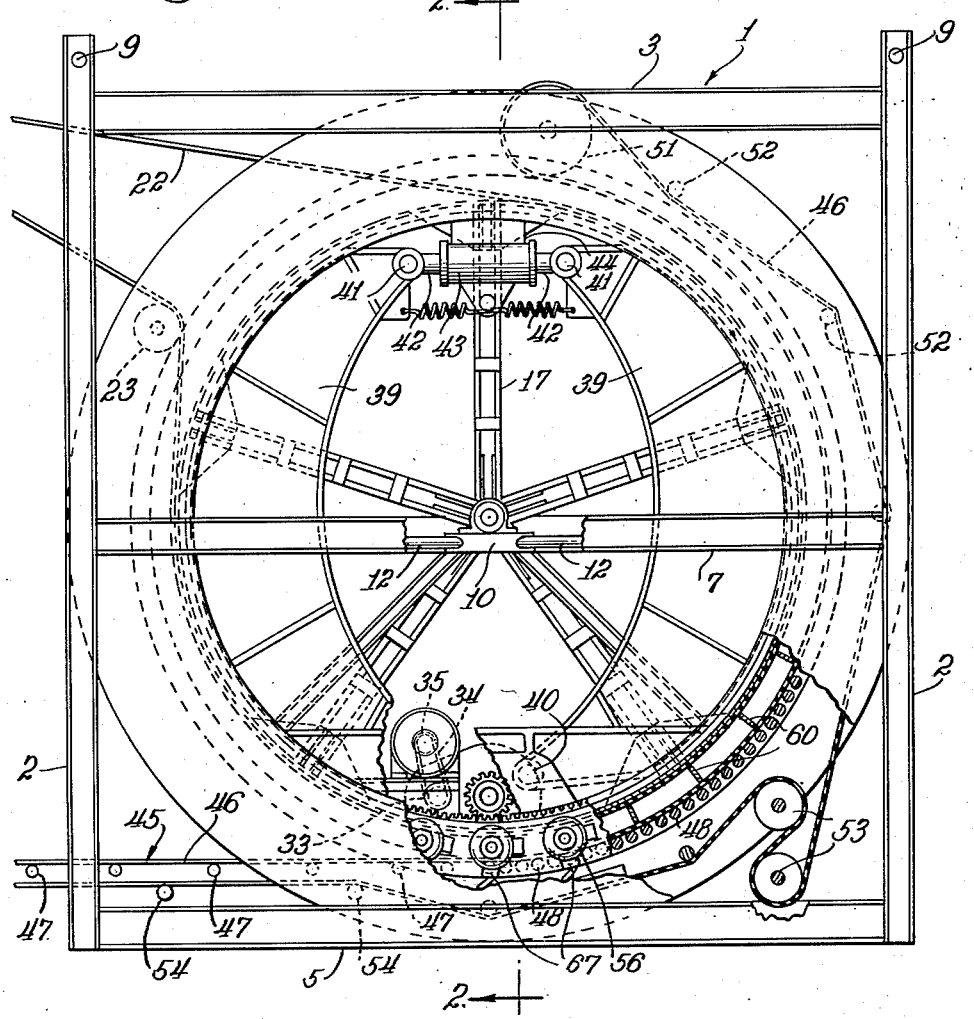
Fig. 1 is a front elevational view of the device embodying the present invention, parts being broken away.

Referring in detail to the drawings, 1 indicates a stationary frame comprising columns 2, longitudinal and transverse top beams 3 and 4, respectively, and longitudinal and transverse bottom beams 5 and 6, respectively. The frame 1 also comprises central longitudinal beams 7 which extend between the columns 2 and diagonal struts 8 which are employed to assist in rigidifying the structure. The upper end portions of the columns 2 extend above the top beams 3 and 4 and are provided with apertures 9 which may be engaged by the hooks or chains of a hoist or derrick whereby the frame 1 may be moved from place to place.

Opposite, substantially centrally positioned I-beams 10 are supported by diagonally, downwardly extending supporting beams 11 and horizontally, diagonally extending supporting beams 12 which are secured at their ends to the main frame members of the structure 1. Each of the I-beams 10 carry a bearing 13 in which a shaft 14 is journaled, said shaft being adapted to support a rotatable frame 15 which will be described in detail hereinafter.

The rotatable frame 15 comprises a hub 16 which is rigidly mounted upon shaft 14 and a plurality of spokes 17, comprising built-up structural members, radiate from the hub 16 being reinforced at the hub by reinforcing plates 18. At the outer ends of the spokes 17 said spokes are joined to an annular box-sectioned member 19 by means of spreader plates 20. Between the opposite box-sectioned members 19 an annular web 21 extends which comprises the outer cylindrical periphery of the rotatable frame 15. A belt 22 passes over a guide roll 23 and is trained around the rotatable frame 15 being supported by and of substantially the same width as the web 21. As will be hereinafter more fully described, the belt 22 comprises the discharge conveyor and at its far end it is trained around a return roll (not shown).

Each annular box section 19 comprises two box sections, an inner box section 24 and an outer box section 25. A ring gear 26 is mounted upon the inner annular wall of the outer box section 25 on one side of the rotating frame 15, said ring gear being adapted to mesh with driving gear 27 mounted upon a shaft 28 which is journaled in bearing 29 carried upon frame member 30 which comprises a portion of the stationary frame 1. Shaft 28 comprises the output shaft of a conventional speed reducer 31 which may be mounted upon the stationary frame and carried by a bracket-supported platform 32 secured to the stationary frame. The speed reducer 31 is provided with an input shaft upon which is mounted a pulley 33 (Fig. 1) and a belt 34 is trained around and drives the pulley 33. The belt is also trained around motor pulley 35 which is mounted upon the shaft of an electric motor 36. The motor 36 is carried by a frame member 37 which is supported on the rigid frame 1. The arrangement is such that, when motor 36 is energized, said motor drives gear 27 through the speed reducer 31 wherein the motor speed is reduced and the torque at the output shaft 28 is increased. The gear 27, in turn, drives ring gear 26 whereby the rotating frame 15 is rotated with shaft 14 which is journaled in the bearings 13. Of course, as the rotating frame 15 is driven, belt 22 moves therearound.

Mounted on the inner face of the opposite box section 19 is an annular brake drum 38 and a pair of arcuate brake shoes 39 are adapted to bear upon the inner face of the brake drum 38 when the brakes are applied. Each brake shoe 39 is pivoted at one end, as at 40, to a portion of the stationary frame. The opposite ends of the brake shoes are pivotally connected as at 41 to brake rods 42 which operate in a hydraulic cylinder 43, the cylinder being mounted upon a bracket 44 which is secured to a portion of the stationary frame. The arrangement is such that when fluid is introduced to the brake cylinder 43 from a suitable controlled source of fluid under pressure (not shown) the rods 42 are moved outwardly with respect to the cylinder 43 and the arcuate faces of the brake shoes 39 make frictional contact with the inner face of the brake drum 38.

A feed conveyor 45 is employed with the device and comprises an endless conveyor belt 46 which at one end is trained around a terminal return roll (not shown). The upper pass of the conveyor belt 46 may be supported in a substantially horizontal plane by means of supporting rollers 47, said upper pass being disposed substantially tangentially with respect to the lower portion of the rotating frame 15. A plurality of supporting rollers 48 are disposed along an arcuate line which follows the circumference of the rotating conveyor 14 and the surfaces of the rollers 48 are spaced from the surface of the discharge conveyor belt 22 where said belt passes from the lower portion of the rotating frame 15 to substantially the point where said belt leaves the rotating frame at its substantially uppermost portion. In other words, the rollers 48 follow the circumference of the rotating frame for substantially 180°. The rollers 48 are disposed closely adjacent each other with their axes parallel to the axis of shaft 14 and each of the rollers is pivotally carried on opposite arcuate brackets 49 which in turn are mounted upon annular frame member 50 comprising a portion of the stationary frame.

The upper pass of the feed conveyor belt 46 is adapted to carry material to be elevated and hence as said belt moves, the lower surface of the belt rests upon the upper surface of the rolls 48. Hence, the upper pass of the belt follows said rolls in a path which is coaxial with the axis of the rotating conveyor 15 and said upper pass during movement along its arcuate path is spaced from the discharge conveyor belt 22. Adjacent the upper portion of travel of the rotating conveyor 15 the upper pass of the feed conveyor belt 46 is trained around a terminal return roll 51. Thereafter said belt passes into contact with guide rolls 52 and over conventional belt tightener rolls 53 and eventually moves parallel to the upper pass of the conveyor 45 over guide rolls 54. The arrangement is such that the material to be elevated is deposited upon the upper pass of the belt 46 and is carried through an arcuate path which follows substantially 180° of the circumference of the rotating frame 15. It will be noted that any material carried upon the upper pass of the belt 46, as it reaches the upper portion of the rotating frame 15 will be transferred to the upper pass of the discharge conveyor belt 22. This operation will be described more in detail hereinafter.

As has been hereinbefore described, the material resting upon the upper pass of the feed belt 46 tends to cause said belt, when passing over the rollers 48, to rest upon said rollers. However, when the belt 46 moves in the upper portion of its arcuate travel the material is transferred to belt 22. Hence, in order that the feed belt 46 will move arcuately along the surfaces of rollers 48, that is, in spaced relationship with belt 22, belt 46 is constructed wider than belt 22, the side edges thereof being positioned in contact with the outer annular face of box section 24, as shown best at 55 in Fig. 4. The box sectioned member 19, including the box section 24, moves with the rotatable frame 15 and, hence, there is no relative movement between the belt 46 and the box section 24.

Where material is raised from a lower level to an upper level using conveyor belts, the rate at which material is raised vertically relative to the travel of the belt is usually dependent upon the angle of slip of the material upon the belt surface. This necessarily implies that the pitch of the conveyor is relatively small and such a conveyor has only limited uses. It has heretofore been proposed to provide cleats or bars upon the surface of the belt to prevent the backward slipping of the material. By this expedient the belt can be moved up a steeper pitch. However, in employing this expedient the capacity of the belt as an elevator is restricted.

As a feature of the present invention the belt 46 which comprises the essential portion of the elevator moves in a relatively abrupt fashion from the lower portion of the rotatable frame 15 to the upper portion thereof. To prevent the material carried by the belt from slipping upon the surface of the belt as it is raised, I contemplate the provision of a plurality of blades or other projecting members which are disposed in transverse relationship to the belt and extend into the space between the belt 46 and the belt 22. Provision of the blades effectively prevents the material from slipping backwardly along the surface of the belt 46, that is, the material carried by the belt is positively moved upwardly and is not dependent upon its own frictional relationship to the surface of the belt. The blades and means for manipulating the blades will be hereinafter more fully described.

As has been hereinbefore described, the box sections at each side of the rotating frame 15 is annular. I propose to mount upon the outer lateral face of each of the box sections 19 in circumferentially spaced relationship a plurality of electric motors 56, said motors being secured in any suitable fashion to the lateral faces of the box sections 19. The motors 56 are all disposed with their shafts parallel to shaft 14. The shaft of each motor is of hollow construction as shown best at 57 in Fig. 4 and at the end of said shaft a nut 58 is carried, said nut being provided with internal threads which engage with a threaded shank 59 which passes through the hollow shaft 57. When a motor 56 is operated the threaded shank 59 is moved inwardly and outwardly with respect to the motor 56. A blade 60 is carried at the outer end of each of the shanks 59, said blade passing through a slot 61 in the outer wall of the box section 24. The intermediate wall 62 between box sections 24 and 25 is also provided with a slot 63 through which said blade may pass and the outer wall of box section 25 is provided with a slot 64 for the reception of the rear end of the blade 60.

The arrangement is such that each blade 60 may be projected into or withdrawn from space 65 between the feed conveyor belt 46 and the discharge conveyor belt 42 as said belts pass arcuately over the rotating frame 15. As has been hereinbefore described, motors 56 are mounted on each of the box sections 19. Each of the motors 56 is associated with a blade 60 together with the hereinbefore described mechanism for moving the blade inwardly and outwardly in the space 65 and the motors 56 and blades 60 are so disposed on opposite box section members 19 that said blades move toward or away from each other in the space 65, that is, said blades are in opposite alignment with each other. Of course, if desired, the motors on one box section 19 may be staggered relative to the motors on the opposite box section and hence the blades 62 projected into opposite ends of the space 65 may be staggered with respect to each other.

In the operation of the device described herein, material to be conveyed and elevated may be loaded upon the upper pass of the horizontal portion of the feed conveyor 45. As the belt moves forwardly it eventually moves beneath the rotating frame 15 and the side edges of the belt move beneath the box section 24, as shown at 55 in Fig. 4. When the motor-operated blades 60 on each side of the rotating frame reach their lowermost position of travel upon the rotating frame, that is, where the upper pass of belt 46 moves tangent to the rotating frame, the blades 60 will have been retracted from the space 65, as will be hereinafter more fully described. Consequently, the material carried by the belt 46 moves into the space 65 between belts 46 and 22.

Associated with each motor 56 is a pair of conventional limit switches 66 and 67 each of which are mounted upon the rotatable frame, said switches being connected to a conventional reversing circuit for each motor indicated diagrammatically at 68'. The arrangement is such that when switch 66 is depressed the motor 56 associated therewith will be operated in such direction as to cause the blade 60 associated therewith to move outwardly into space 65, and when switch 67 is depressed the reverse operation will take place, that is, the blade 60 will be moved to retracted position. Hence, as hereinbefore described, when the material carried by belt 56 initially moves into space 65 said blades will be in retracted position.

A cam bar 68 is carried by the stationary frame 1 adjacent the lowermost position of rotating frame 15 thereon, said cam bar being disposed in the path of travel of the switches 66. Hence, when the frame 18 rotates, the motors 56 are sequentially energized by the depressing of switches 66 whereby blades 60 associated with the energized motors move into the space 65. If the material carried by belt 46 is a discrete material such as coal, ore, limestone or the like, the movement of the blades 60 will tend to displace said material and provide spaced baffles or partitions in the annular space between belts 46 and 22 and, hence, as the frame 15 continues its rotation and the belt 46 moves upwardly at an increasingly acute angle, the material will be prevented from slipping rearwardly to any substantial extent.

As the material continues its arcuate travel it is eventually inverted to a more or less degree as it passes the horizontal in the arcuate movement of the rotating frame. At the uppermost position all of the material will rest upon the upper pass of the discharge conveyor belt 22. Prior to reaching this position, however, the motors in question pass a second cam bar 69 which is disposed in the path of travel of the switches 67 whereby said switches are depressed and the motors are energized, being rotated, however, in the opposite direction. This rotation of the motors retracts the blades 60 whereby the material is permitted to move freely with the belt 22.

Of course, it is to be understood that two cam bars 68 and two cam bars 69 are employed so that the switches 66 and 67 on each side of the rotating frame will be actuated. Preferably, the respective cam bars are placed opposite to each other but, if desired, they may be slightly offset so that the blades 60 on opposite sides will move inwardly and outwardly of space 65 at different times. It may be found that this expedient is desirable when dealing with certain types of materials particularly when the blades are being inserted into the mass of the material.

It is also to be understood that the use of the present invention is not to be limited to bulk material such as granular or discrete material, since it may also be used to handle packed material, in which case it may, however, be necessary to index the packages on the belt 46 so that the blades 60 will not crush the packages.

Referring particularly to Figs. 5 and 6 a modification of the means for projecting and extracting the baffle blades into the space 65 is shown. In this form of the invention a single motor 70 operates a pair of opposite blades 71, there being a plurality of said motors disposed in spaced relationship upon the rotating frame 15. Each motor 70 is mounted upon the inner face of an annular web 72, which is similar to web 21, hereinbefore described. Motor shaft 73 extends from opposite ends of the motor 70 and each extending end is connected by a conventional universal joint 74 to an inclined shaft 75, said shafts being journaled adjacent said universal joints by bearings 76 carried by web 72. The shafts 75 extend toward opposite sides of the rotary frame and each is journaled at its end in a ball bearing assembly 77 housed in a collar 78 which, in turn, is mounted upon an outer wall of annular box sectioned beam 79, which is similar to box sectioned beam 19.

Each blade 71 is carried by a threaded shank 80 which, in turn, is in threaded engagement with an internally threaded nut 81. Nut 81 is mounted for rotation within a housing 82 which is mounted upon the outer wall of the box sectioned beam 79. The outer periphery of the nut 81 carries gear teeth 83 which mesh with the teeth of a gear 84 carried at the end of shaft 75. The arrangement is such that when motor 70 is rotated, blades 71 move inwardly toward each other into the space 65 or are retracted away from each other from said space.

The blades 71 function similarly to blades 60, hereinbefore described, the motors 70 being provided with switches (not shown) similar to switches 66 and 67, whereby the motors are energized as they pass the lowermost position of travel of the rotating frame and being energized in the opposite direction as they approach the uppermost position of travel of the rotatable frame. In this fashion blades 71 are moved inwardly to provide baffles for the material carried on the belt 46 and are moved outwardly when the material is transferred from the belt 46 to the belt 22.

Referring particularly to Figs. 7, 8 and 9 another modified form of blade-moving mechanism is illustrated. The rotating frame upon which the blade-moving mechanism is carried is substantially the same as that hereinbefore described, having annular box sectioned beams 85 at each side of the rotating frame, and having feed belt 46 and discharge belt 22 carried upon the rotating frame, as has been hereinbefore described.

A plurality of electric motors 86 are carried in spaced circumferential relationship upon each of the box sectioned beams 85, but in this form of the invention the motors and blades actuated thereby on opposite sides of the frame are staggered. However, if desired, said opposite motors and blades may be in transverse alignment upon the frame. Each motor 86 carries a gear 87 which meshes through an idler gear 88 with gear 89, the gears being carried by a bracket 90. Gear 89 is keyed to a screw 91 which projects inwardly of the frame toward the space 65.

A blade 92 is provided with an elongated aperture 93 of a diameter greater than the diameter of the screw 91 whereby said screw may move into and out of said aperture freely. An internally threaded nut 94 is rigidly carried by said blade at one end of said aperture, the screw 91 being threadedly engaged by the nut whereby rotation of the screw produces rectilinear movement of the blade 92. Hence, when motor 86 is actuated blade 92 is moved inwardly or outwardly of space 65, depending upon the direction of rotation of the motor.

The frame of the blade-moving mechanism shown in Figs. 7, 8 and 9 operates in a manner similar to that hereinbefore described, that is, a limit switch (not shown) similar to switch 66, will be contacted and depressed by a cam bar (not shown) similar to cam bar 68 and the blades 92 will be moved inwardly into space 65 to function as baffles or supports for the material carried in said space. When the rotating frame moves to carry the material to the upper portion of its travel, a limit switch (not shown) similar to limit switch 67, will actuate the motor 86, but in a reverse direction whereby the blades 92 will be retracted from space 65.

In all forms of the invention hereinbefore described the shape of the blades will depend upon the character of material being conveyed and elevated. If the material is a discrete material, such as sand or the like which offers little resistance to penetration of the blades, relatively flat blades, as shown, may be employed. If, however, the material is coarse and lumpy the blades may take the form of bars, pointed, if desired, whereby penetration of the blades into the material may be facilitated. Hence, wherever in the specification and claims the expression "blades" is employed, it is intended to cover projecting members of any desired or suitable shape.

I claim as my invention:

1. An elevator conveyor comprising a relatively stationary frame, a relatively movable frame mounted upon said stationary frame, means carried by said stationary frame for moving a portion of said movable frame in an upwardly direction, means carried by said stationary frame and spaced from a portion of said movable frame to provide zones along the upward path of travel of said movable frame for the reception of material to be elevated, a plurality of projecting members carried by said movable frame and laterally movable into and out of said zone, and means carried by one of said frames for laterally moving said projecting members into and out of said zone.

2. An elevator-conveyor comprising a relatively stationary frame, a relatively rotatable frame carried by said stationary frame, means for rotating said rotatable frame in a substantially vertical plane, a discharge belt trained around the upwardly moving portion of said rotatable frame for arcuate travel thereon, a feed belt mounted for movement around substantially the same portion of the rotatable frame in radial spaced relationship to said discharge belt whereby an arcuate space is provided between said belts, said feed belt being adapted to carry material to be elevated for a portion of the arcuate travel of said belt and the discharge belt being adapted to carry said material for the remaining portion of the arcuate travel, movable projecting members carried by said rotatable frame for movement relative to both belts into and out of the space between said belts, and means carried by one of said frames for moving said projecting members relative to both belts inwardly and outwardly of said space.

3. An elevator-conveyor comprising a relatively stationary frame, a relatively rotatable frame carried by said stationary frame, means for rotating said rotatable frame in a substantially vertical plane, a discharge belt trained around the upwardly moving portion of said rotatable frame for arcuate travel thereon, a feed belt mounted for movement around substantially the same portion of the rotatable frame in radial spaced relationship to said discharge belt whereby an annular space is provided between said belts, said feed belt being adapted to carry material to be elevated for a portion of the arcuate travel of said belt and the discharge belt being adapted to carry said material for the remaining portion of the arcuate travel, movable projecting members carried by said rotatable frame for lateral movement into and out of the space between said belts, and means carried by said rotatable frame for moving said projecting members laterally inwardly and outwardly of said space.

4. An elevator-conveyor comprising a relatively stationary frame, a relatively rotatable frame carried by said stationary frame, means for rotating said rotatable frame in a substantially vertical plane, a discharge belt trained around the upwardly moving portion of said rotatable frame for arcuate travel thereon, a feed belt mounted for movement around substantially the same portion of the rotatable frame in radial spaced relationship to said discharge belt whereby an annular space is provided between said belts, said feed belt being adapted to carry material to be elevated a portion of the upward arcuate travel of said belt and the discharge belt being adapted to carry said material the remaining portion of the upward arcuate travel, spaced movable blades carried by said rotatable frame for movement relative to both belts into and out of the space between said belts, and means carried by said rotatable frame for moving said blades inwardly into said annular space adjacent the lower portion of said space and for moving said blades relative to both belts outwardly of said space adjacent the upper portion of said space.

5. An elevator-conveyor comprising a relatively stationary frame, a relatively rotatable frame carried by said stationary frame, means for rotating said rotatable frame in a substantially vertical plane, a discharge belt trained around the upwardly moving portion of said rotatable frame for arcuate travel thereon, a feed belt mounted for movement around substantially the same portion of the rotatable frame in radial spaced relationship to said discharge belt whereby an annular space is provided between said belts, said feed belt being adapted to carry material to be elevated a portion of the upward arcuate travel of said belt and the discharge belt being adapted to carry said material the remaining portion of the upward arcuate travel, spaced movable blades carried by said rotatable frame for movement relative to both belts into and out of the space between said belts, and means carried by said rotatable frame for moving said blades relative to both belts inwardly into said annular space adjacent the lower portion of said space and for moving said blades relative to both belts outwardly of said space adjacent the upper portion of said space, said means comprising reversible electric motors carried by said rotatable frame, means carried by said stationary frame adjacent the lower portion of said annular space for actuating said motors in a predetermined direction, and means carried by said stationary frame adjacent the upper portion of said annular space for actuating said motors in an opposite direction.

6. The combination with an elevator-conveyor having a frame mounted for rotation in a substantially vertical plane and having an annular space for material to be elevated at its arcuate periphery defined by radially spaced defining walls movable with said frame, of movable partitioning means for said space comprising a plurality of projecting members adapted to be carried by the rotatable frame, said projecting members being circumferentially spaced from each other, and means for moving said projecting members laterally into and out of said annular space with the axes thereof disposed transverse to the direction of travel of said space-defining walls.

7. The combination with an elevator-conveyor having a frame mounted for rotation in a substantially vertical plane and having an annular space for material to be elevated at its arcuate periphery defined by radially spaced defining walls movable with said frame, of movable partitioning means for said space comprising a plurality of relatively flat blades adapted to be carried by the rotatable frame, said blades being circumferentially spaced from each other, and means for moving said blades relative to said spaced defining walls into and out of said annular space with the flat faces of said blades disposed transverse to the direction of travel of said space-defining walls, said blade-moving means comprising electric motors adapted to be carried by the rotatable frame.

8. The combination with an elevator-conveyor having a frame mounted for rotation in a substantially vertical plane and having an annular space for material to be elevated at its arcuate periphery defined by radially spaced defining walls movable with said frame, of movable partitioning means for said space comprising a plurality of relatively flat blades adapted to be carried by the rotatable frame, said blades being circumferentially spaced from each other, and means for moving said blades laterally into and out of said annular space with the flat faces of said blades disposed transverse to the direction of travel of said space-defining walls.

9. The combination with an elevator-conveyor having a frame mounted for rotation in a substantially vertical plane and having an annular space for material to be elevated at its arcuate periphery defined by radially spaced defining walls movable with said frame, of movable partitioning means for said space comprising a plurality of relatively flat blades adapted to be carried by the rotatable frame on both lateral sides of said frame, the blades on each side of the frame being circumferentially spaced from each other, each blade on one side of the frame being opposite a blade on the other side of the frame, and means for moving said blades laterally and independently of said defining walls into and out of said space.

10. The combination with an elevator-conveyor having a frame mounted for rotation in a substantially vertical plane and having an annular space for material to be elevated at its arcuate periphery defined by radially spaced defining walls movable with said frame, of movable partitioning means for said space comprising a plurality of relatively flat blades adapted to be carried by the rotatable frame on both lateral sides of said frame, the blades on each side of the frame being circumferentially spaced from each other, each blade on one side of the frame being opposite a blade on the other side of the frame, said blade-moving means comprising electric motors, a threaded shank carried by each of said blades, nut means threadedly engageable with each threaded shank and means connecting each electric motor to opposite nut means to rotate said nut means in opposite angular directions to move said shanks axially in opposite directions.

11. The combination with an elevator-conveyor having a frame mounted for rotation in a substantially vertical plane and having an annular space for material to be elevated at its arcuate periphery defined by radially spaced defining walls movable with said frame, of movable partitioning means for said space comprising a plurality of relatively flat blades adapted to be carried by the rotatable frame, said blades being circumferentially spaced from each other, and means for moving said blades into and out of said annular space with the flat faces of said blades disposed transverse to the direction of travel of said space-defining walls, said blade-moving means comprising electric motors, a screw rotated by each of said motors and nut means connecting each screw and a blade to move said blade axially of said screw when said screw is rotated.

12. An elevator conveyor comprising a frame, a pair of upwardly movable belts carried by said frame, said belts being spaced from each other and movable parallel to each other for a substantial portion of their upward travel to provide a zone between said belts for material to be elevated, and means projecting into said zone between said belts to inhibit rearward movement of the material carried between said belts, and means for moving said projecting means relative to both belts.

13. An elevator conveyor comprising a relatively stationary frame, a movable frame carried by said relatively stationary frame, endless flexible means carried by said movable frame in spaced relationship to a portion of said movable frame for the reception of material to be moved, and laterally movable projecting means carried by said movable frame for extending laterally into said space to inhibit rearward movement of the material in said space, and means for moving said projecting means laterally into said space.

References Cited in the file of this patent

UNITED STATES PATENTS

| | | |
|---|---|---|
| 490,171 | Spencer | Jan. 17, 1893 |
| 579,451 | Richards | Mar. 23, 1897 |
| 1,776,420 | Eichenberger | Sept. 23, 1930 |
| 1,919,275 | Dunham | July 25, 1933 |